United States Patent [19]
Schendel

[11] Patent Number: 5,756,896
[45] Date of Patent: May 26, 1998

[54] EXTENDED RANGE ACCELEROMETER

[75] Inventor: Robert E. Schendel, Kingwood, Tex.

[73] Assignee: Texas Components Corporation, Houston, Tex.

[21] Appl. No.: 764,263

[22] Filed: Dec. 12, 1996

Related U.S. Application Data

[63] Continuation of Ser. No. 523,655, Sep. 5, 1995, abandoned.

[51] Int. Cl.[6] .................................................. G01P 15/08
[52] U.S. Cl. ........................... 73/514.08; 73/514.31; 200/61.45 M
[58] Field of Search ..................... 73/514.05, 514.06, 73/514.07, 514.08, 514.31, 522; 336/30, 40; 200/61.45 M, 61.53

[56] References Cited

U.S. PATENT DOCUMENTS

| | | | |
|---|---|---|---|
| 2,797,912 | 7/1957 | Trostler | 73/514.05 |
| 3,564,928 | 2/1971 | Slater et al. | 73/514.06 |
| 3,863,508 | 2/1975 | Scarborough et al. | 73/514.06 |
| 4,043,204 | 8/1977 | Hunter et al. | 73/514.08 |
| 4,845,988 | 7/1989 | Russell et al. | 73/514.08 |
| 4,905,517 | 3/1990 | Crowe et al. | |
| 4,922,753 | 5/1990 | Idogaki et al. | |
| 4,991,438 | 2/1991 | Evans | 73/514.08 |

FOREIGN PATENT DOCUMENTS

| | | | |
|---|---|---|---|
| 63-151862 | 6/1988 | Japan | 73/514.08 |
| 63-151864 | 6/1988 | Japan . | |
| 63-153472 | 6/1988 | Japan . | |
| 466456 | 10/1975 | U.S.S.R. . | |

*Primary Examiner*—Christine K. Oda
*Attorney, Agent, or Firm*—Larry Mason Lee

[57] ABSTRACT

A low noise extended dynamic range accelerometer useful for sensitive seismic observations. The accelerometer's extended range is obtained by utilizing fixed end magnets which non-linearly oppose movement of the magnetic proof mass. Additionally, an aluminum housing material contributes eddy current dampening which produces a critically damped system over a broad range of accelerations.

12 Claims, 3 Drawing Sheets

EXTENDED RANGE ACCELEROMETER

This application is a continuation of application Ser. No. 08/523,655, filed Sep. 5, 1995 now abandoned.

SUMMARY OF THE INVENTION

1. Field of Invention

The present invention relates to the field of apparatus for and methods of measuring accelerations, particularly those accelerations in the range of interest for seismic movement measurements.

2. Background of the Invention

Prior art in the field of apparatus for and methods of measuring accelerations include utilization of a proof mass suspended by one or more springs within a sensor housing such that the proof mass is limited in motion to motion along the central axis of the housing, and such that the proof mass displacement along,. such central axis is opposed by the springs and measured as a measurement of acceleration along such central axis. Substantial limitations are present with such an approach to the problem of acceleration measurement. Temperature variations tend to create variations in the spring length and modulus of elasticity. Restraint of the proof mass from movement lateral to the central axis of the sensor housing is achieved by physical contact between the proof mass and the sensor housing inner wall, or by physical contact between the proof mass and the springs, thus generating mechanical noise and erroneous, due to frictional contact and the conversion of work to heat within the springs, displacement and thus measurements of the movement of the proof mass along the central axis.

Additional prior art in the field of apparatus for and methods of measuring accelerations include utilization of a magnetic, or permeable, proof mass suspended in a ferro fluid within a sensor housing as the result of either an internal or external magnetic field such that the movement and positioning of the proof mass within the sensor housing is controlled by and often measured by variations in such magnetic field strength. All of such apparatus which utilize an external electromagnetic field to control, and/or null, the movement and/or positioning of the proof mass have as a limitation on their sensitivity of measurement the noise inherent in the electrical/electronic circuits driving and/or comprising the electromagnetic field generator.

Many of the apparatus and methods of measuring accelerations in the prior art attempt to linearize, either by physically limiting the range of motion of the proof mass or by varying the external magnetic field strength, the relationship between the physical displacement of the proof mass within the sensor housing and the acceleration to be measured. Inherent in such attempts to linearize the relationship are either excessively limited range of usefulness and/or external noise generation in the positioning mechanism.

A substantial need exists for apparatus and methods of measuring accelerations which do not introduce noise, either mechanical or electrical, in their proof mass positioning means.

A further need exists for apparatus and methods of measuring accelerations which are capable of measuring acceleration over a very wide range of values.

Accordingly, it is a primary object of this invention to provide an apparatus and method of measuring accelerations over a very wide range of values which does not introduce noise, either mechanical or electrical, in its proof mass position detecting means.

DESCRIPTION OF THE PREFERRED EMBODIMENT

Figure 1:
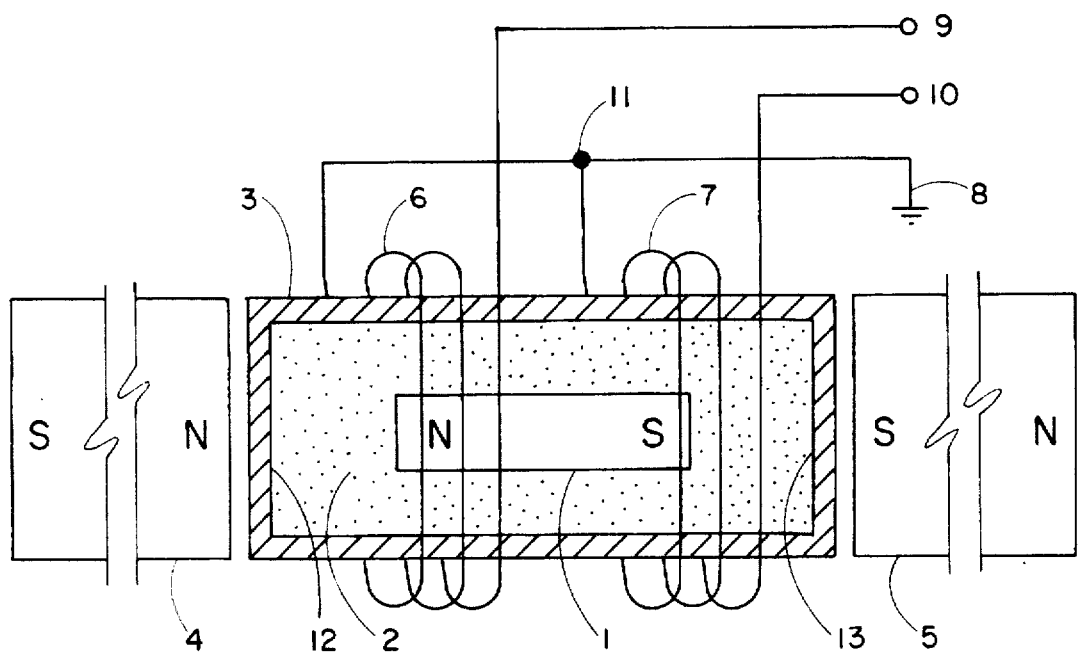
FIG. 1 is a sectional view of the apparatus of the instant invention, with a schematic representation of pickup coils superimposed thereon, and with block diagramatic representations of lateral magnetic end-fields and of the magnet central to the apparatus.
Figure 2:
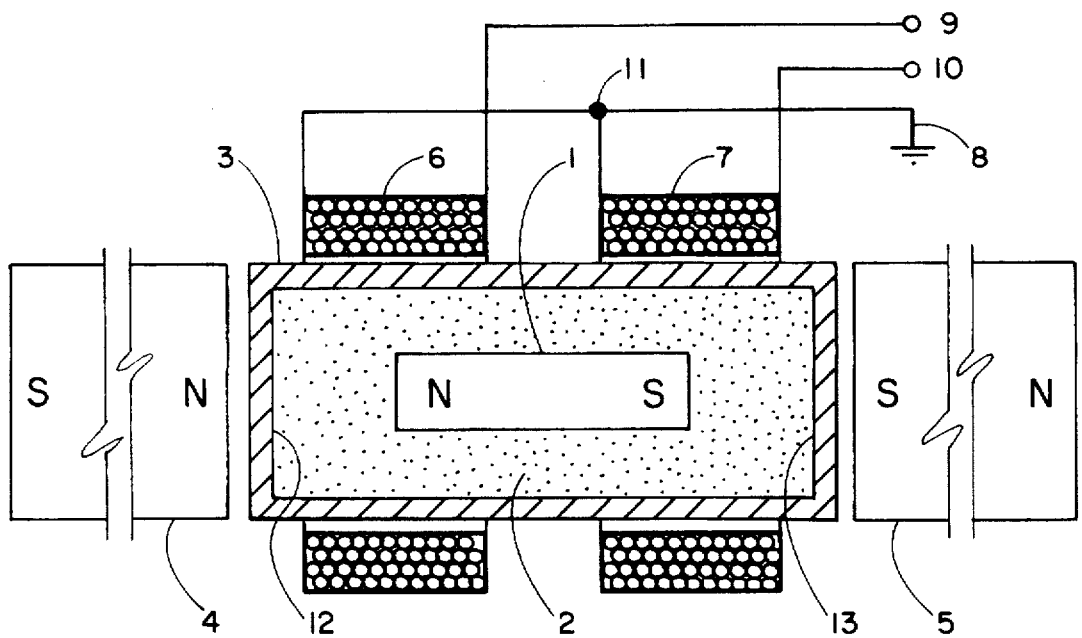
FIG. 2 is a sectional view of the apparatus of the instant invention and of the pickup coils, with a schematic representation of the pickup coil electrical connections superimposed thereon, and with block diagramatic representations of lateral magnetic end-fields and of the magnet central to the apparatus.

As seen in FIGS. 1 and 2, the instant invention comprises a magnetic proof mass (1), suspended in a ferro fluid (2), within a sensor housing (3), which sensor housing (3) has external magnetic fields (4 and 5) disposed at each of its ends (12 and 13), and signal pickup coils (6 and 7).

The magnetic proof mass (1) in the preferred embodiment is a permanent magnet, although other embodiments might use a permeable material with an induced field. Likewise, the external magnetic fields (4 and 5) in the preferred embodiment are created by permanent magnets, although other embodiments might use either a permeable material with an induced field or an electromagnet.

The ferro fluid (2) of the preferred embodiment is a commonly available fluid with colloidally suspended ferrite particles which align themselves with the magnetic fields (1, 4 and 5). The magnetic field set up between external magnetic field (4), external magnetic field (5), and the internal magnetic field created by the magnetic proof mass (1) aligns the ferrite particles within the ferro fluid (2) and creates magnetic lines of force which position the proof mass (1) in the center of the sensor housing (3).

The sensor housing (3) in the preferred embodiment is comprised of an aluminium cylinder. While another embodiment might not have a cylindrical shape, all embodiments would have a sensor housing (3) made of aluminium. The aluminium sets up eddy currents in the internal surfaces of the sensor housing (3) which provide opposition to the movement of the proof mass (1) and thus acts to dampen such movement. This dampening action substantially limits ringing or oscillation which would be encountered due to the natural motion of the proof mass (1) when forced by an acceleration of the proof mass (1) toward the opposing magnetic field of either external magnetic field (4 or 5).

The external magnetic fields (4 and 5) are permanent magnets in the preferred embodiment, shown as present at each end (12 and 13) of the cylinder which is the sensor housing (3) and aligned with magnetic fields opposing those of the proof mass (1). The external magnetic fields (4 and 5) may be generated by bar magnets aligned along the central axis of the sensor housing (3), or they may be generated by another means, such as electromagnets or permanent ring magnets which may be slid over or screwed onto the cylinder of the sensor housing (3) whereby the positioning of such ring magnets become an adjustment of the output function generated by displacement of the proof mass (1) within the sensor housing (3). The strength of the field generated by the external magnetic fileds (4 and 5), and the distance between each of the external magnetic fields (4 and 5) and the proof mass (1), combine to generate a predictable non-linear function relating the acceleration of the proof mass (1) along the central axis of the sensor housing (3).

Pickup coils (6 and 7) may comprise two halves of a single wound coil or two separate like-wound coils as in FIGS. 1 and 2. In either event, the coils are like wound so that any noise generated from an external source will develop identical voltages across each of the pickup coils (6 and 7). The left-hand end of pickup coil (6) and the left-hand end of pickup coil (7) are electrically connected (11) together and to ground (8). The output (9) of pickup coil (6) and the output (10) of pickup coil (7) are the differential inputs to the input amplifier (16) shown on FIG. 4. The identical voltages developed across the pickup coils (6 and 7) by external noise will cancel at the input to the input amplifier (16).

Figure 4:
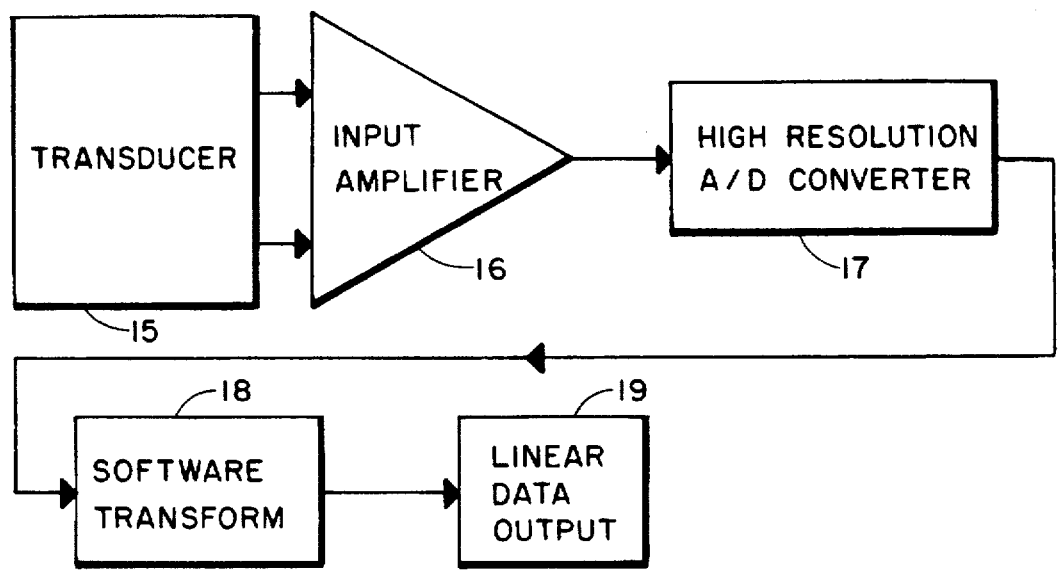
FIG. 4 is a block diagram of the electrical/electronic circuits portion of the apparatus.

The transducer (15) depicted in FIG. 4 comprises, in the preferred embodiment, the pickup coils (6 and 7). However, certain pre-amplification, pulse-shaping, and isolation may be inserted in the transducer (15) without departing from the instant invention. The outputs of the transducer (15) are, in the case of noise, of equal amplitude and of the same phase, and, in the case of signal generated by movement of the proof mass (1) within the sensor housing (3), of equal amplitude and of opposite phase.

As seen in FIG. 4, the outputs (9 and 10) of the transducer (15) are input to the differential inputs of the input amplifier (16) and the output of the input amplifier (16) is input to a high resolution analog to digital (A/D) converter (17). The digital output of the high resolution analog to digital (A/D) converter (17) is then input to a computer and there subjected to a software transform (18). The output of the software transform (18) is then the linear data output (19) which is a number corresponding to the displacement of the proof mass (1) within the sensor housing (3).

In operation, the sensor housing (3), with its associated and physically attached magnetic field (4 and 5) generators and pickup coils (6 and 7) are attached to the body whose acceleration is to be measured. The proof mass (1) is a body at rest which tends to remain at rest. The magnitude of the acceleration between the proof mass (1) and the sensor housing (3) is represented by the differential between the voltages at the outputs (9 and 10) of the pickup coils (6 and 7). The differential between the voltages at the outputs (9 and 10) will not, in general, be a linear function of the magnitude of the acceleration, but must, rather, be plotted for various known values of acceleration.

Figure 5:
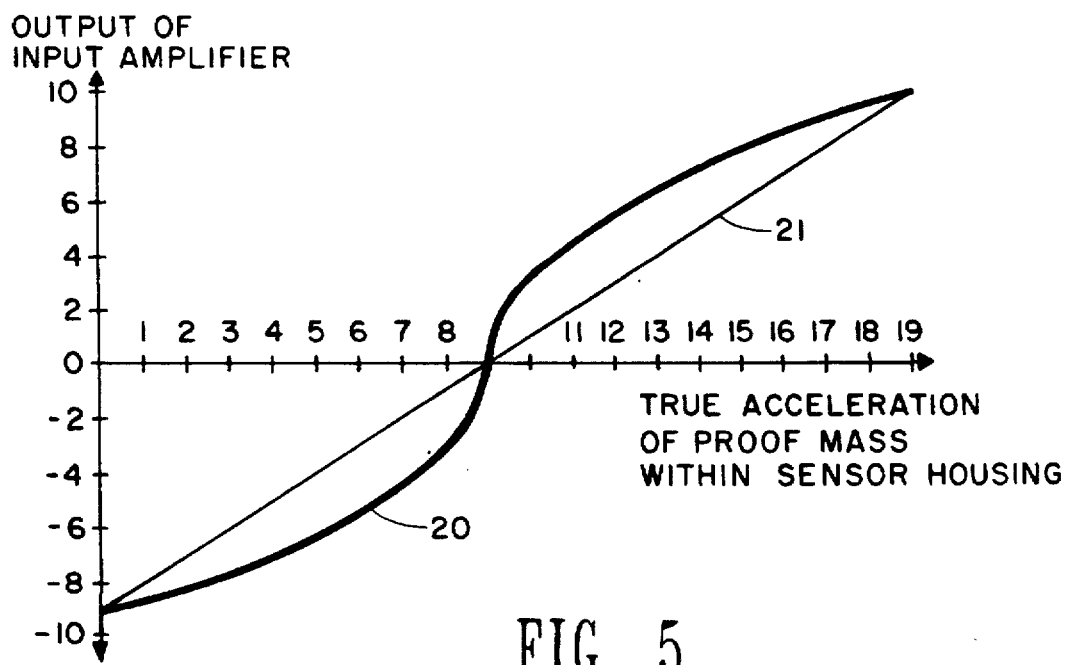
FIG. 5 is a graphical representation of an exemplar function output from the transducer portion of the apparatus superimposed upon an graphical representation of the data output of the apparatus.

As indicated in FIG. 5, the output of the input amplifier (16) may be represented on an x-y axis where the y axis is amplitude of the output of the input amplifier (16) and the x axis is the true acceleration of the magnetic proof mass within the sensor housing due to mechanical input. The waveform (20) in FIG. 5 represents the arbitrary non-linear relationship between the acceleration of the proof mass (1) within the sensor housing (3), as indicated by the output of the input amplifier (16), of the instant invention and the actual acceleration that the sensor housing (3) is being subjected to. Line (21) is the idealized actual relationship between the acceleration that the sensor housing (3) is being subjected to and the amplitude of the output of the input amplifier (16), a relationship that is realized by the output of the software transform (18) of the instant invention. The arbitrary non-linear relationship represented by waveform (20) which must be measured and determined for a given unit of the preferred embodiment, as such function is utilized by the software transform (18) to provide a linear data output (19). The non-linearity of the waveform (20) is what permits and provides the wide range of the instant invention.

Figure 3:
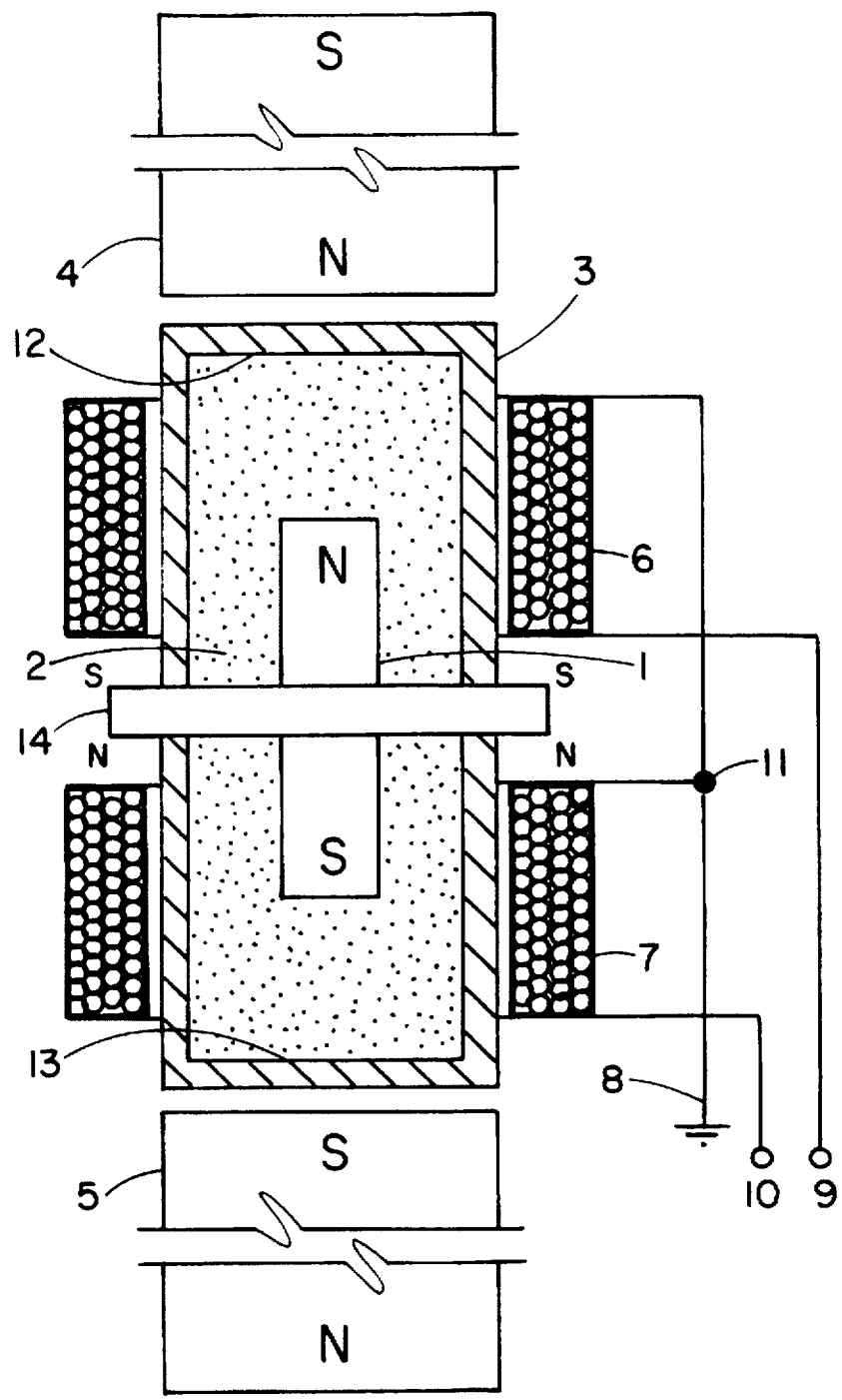
FIG. 3 is a sectional view of the apparatus of the instant invention and of the pickup coils, with a schematic representation of the pickup coil electrical connections superimposed thereon, and with block diagramatic representations of the lateral magnetic end-fields, the magnet central to the apparatus, and the bias magnetic field located between the pickup coils around the circumference of the apparatus.

A second embodiment of the instant invention is disclosed in FIG. 3. A common problem encountered in use of the instant invention is the offset of the proof mass (1) from the center of the sensor housing (3) toward the center of the earth when the instant invention is aligned for use in a plane whereby the center line of the sensor housing (3) is perpendicular to the earth's surface. Such an offset of the proof mass (1) from the center of the sensor housing (3) produces opposite, but not equal, outputs from the pickup coil (6) output (9) and the pickup coil (7) output (10). These unequal outputs create a new, additional, source of nonlinearity which can be compensated for with a bias magnetic field (14) which is located around the circumference of the sensor housing (3) at the center of the sensor housing (3) and is aligned to oppose the force of gravity pulling the proof mass (1) toward the end (12 or 13) of the sensor housing (3) closest to the earth. The effects of gravity may also be compensated for by modifying the strength and/or position of the external magnetic fields (4 and 5) relative to the proof mass (1) as in the first embodiment. The bias magnetic field (14) is produced in the second preferred embodiment by a permanent magnet, but may without departing from the instant invention be produced by an electromagnet.

Note that the instant invention has deliberately avoided introducing external electrical signals into the sensor body (3) or external electrical signals which interact with the signal pickup coils (6 and 7). The instant invention has, however, deliberately introduced non-linearity into the output of the signal pickup coils (6 and 7) relative to the proof mass (1) velocity at various positions along the central axis of the sensor body (3).

This invention and its operation have been described in terms of a single preferred embodiment, however numerous embodiments are possible without departing from the essential characteristics thereof. Accordingly, the description has been illustrative and not restrictive as the scope of the invention is defined by the appended claims, not by the description preceding them, and all changes and modifications that fall within the stated claims or form their functional equivalents are intended to be embraced by the claims.

I claim:

1. An accelerometer comprising:

a magnetic proof mass, a sensor housing, a ferro fluid, two external magnetic fields, and two signal pickup coils;

wherein said magnetic proof mass is a permanent bar magnet, said ferro fluid substantially fills said sensor housing, said magnetic proof mass is suspended within said sensor housing by the magnetic force fields created between said magnetic proof mass and said ferro fluid, said two external magnetic fields are disposed at opposite ends of said sensor housing, each of said two external magnetic fields are aligned in opposition to the magnetic field created by said magnetic proof mass;

said two signal pickup coils are disposed externally to said sensor housing, said two signal pickup coils are disposed such that said movement of said magnetic proof mass along a center axis of said sensor housing produces an electrical signal across each of said two signal pickup coils, and said two signal pickup coils are electrically connected such that said movement of said magnetic proof mass along the center axis of said sensor housing produces an output electrical signal from each of said two signal pickup coils which is of opposing polarity to the output of the other said two signal pickup coils; and whereby eddy currents, generated by said movement of said magnetic proof mass relative to said sensor housing, create magnetic fields which oppose movement of said magnetic proof mass relative to said sensor housing, said movement of said magnetic proof mass along the center axis of said sensor housing induces an electrical signal within each of said two signal pickup coils, and the amplitude of the differential voltage between said output electrical signals from each of said two signal pickup coils bears a nonlinear relationship to the acceleration of said magnetic proof mass relative to said sensor housing.

2. The accelerometer of claim 1 additionally comprising an input amplifier, an analog to digital converter, and a means for software transformation;

wherein said differential voltage is input to said input amplifier, and an output of said input amplifier is input to said analog to digital converter, and an output of said analog to digital converter is input to said means for software transformation;

whereby said input amplifier serves to amplify said differential voltage, said analog to digital converter output represents the magnitude of said differential voltage, and said means for software transformation serves to convert said output of said analog to digital converter to digital data bearing a linear relationship to the acceleration of said magnetic proof mass within said sensor housing.

3. The accelerometer of claim 1 wherein said cylindrical sensor housing is constructed of aluminum whereby eddy currents are generated by said movement of said proof mass along the center axis of said cylindrical sensor housing.

4. The accelerometer of claim 2 wherein said cylindrical sensor housing is constructed of aluminum whereby eddy currents are generated by said movement of said proof mass along the center axis of said cylindrical sensor housing.

5. The accelerometer of claim 1, wherein no electrical signals external to said sensor housing are input into either of said two signal pickup coils.

6. An accelerometer comprising:

a magnetic proof mass, a sensor housing, a ferro fluid, two external magnetic fields, two signal pickup coils, an input amplifier, an analog to digital converter, and a means for software transformation;

wherein said magnetic proof mass is a permanent bar magnet, said ferro fluid substantially fills said sensor housing, said magnetic proof mass is suspended within said sensor housing by the magnetic force fields created between said external magnetic fields and said ferro fluid, said two external magnetic fields are disposed at opposite ends of said sensor housing, each of said two external magnetic fields are aligned in opposition to the magnetic field created by said magnetic proof mass, said two signal pickup coils are disposed externally to said sensor housing, said two signal pickup coils are disposed such that said movement of said magnetic proof mass along a center axis of said sensor housing produces an electrical signal across each of said two signal pickup coils, and said two signal pickup coils are electrically connected such that said movement of said magnetic proof mass along the center axis of said sensor housing produces an output electrical signal from each of said two signal pickup coils which is of opposing polarity to the output of the other of said two signal pickup coils, eddy currents, generated by said movement of said magnetic proof mass relative to said sensor housing, create magnetic fields which oppose movement of said magnetic proof mass relative to said sensor housing, said movement of said magnetic proof mass along the center axis of said sensor housing induces an electrical signal within each of said two signal pickup coils, the amplitude of the differential voltage between said output electrical signals from each of said two signal pickup coils bears a nonlinear relationship to the acceleration of said magnetic proof mass relative to said sensor housing, said differential voltage is input to said input amplifier, an output of said input amplifier is input to said analog to digital converter, and an output of said analog to digital converter is input to said means for software transformation, said input amplifier serves to amplify said differential voltage and said analog to digital converter output represents the magnitude of said differential voltage; and whereby said means for software transformation serves to convert said output of said analog to digital converter to digital data bearing a linear relationship to the acceleration of said magnetic proof mass within said sensor housing.

7. The accelerometer of claim 6, wherein no electrical signals external to said sensor housing are input into either of said two signal pickup coils.

8. The accelerometer of claim 6, wherein said movement as a function of time is acceleration.

9. The accelerometer of claim 1, wherein said sensor housing is cylindrical.

10. The accelerometer of claim 1, wherein said sensor housing is constructed of aluminum.

11. The accelerometer of claim 6, wherein said sensor housing is cylindrical.

12. The accelerometer of claim 6, wherein said sensor housing is constructed of aluminum.

* * * * *